Jan. 20, 1942.  S. C. FOURNET  2,270,629
METHOD AND APPARATUS FOR MAKING DENTAL RESTORATIONS
Filed June 11, 1940  3 Sheets-Sheet 3
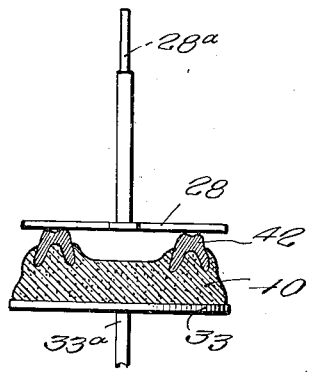
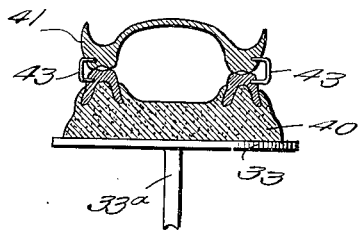
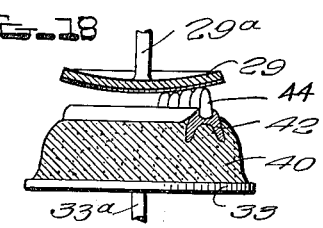
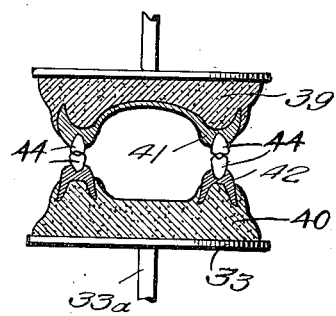
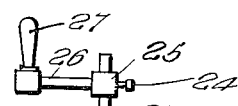
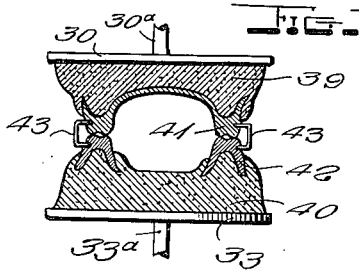
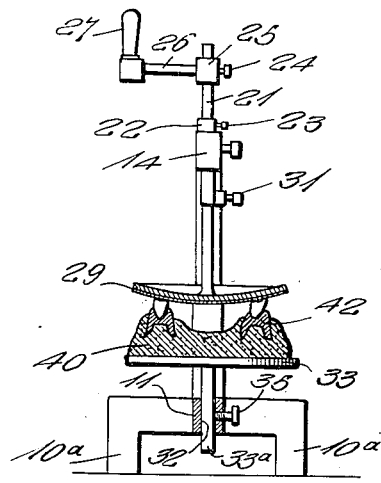
INVENTOR.
Sidney C. Fournet,
BY
Eugene E. Stevens
Attorney Patented Jan. 20, 1942

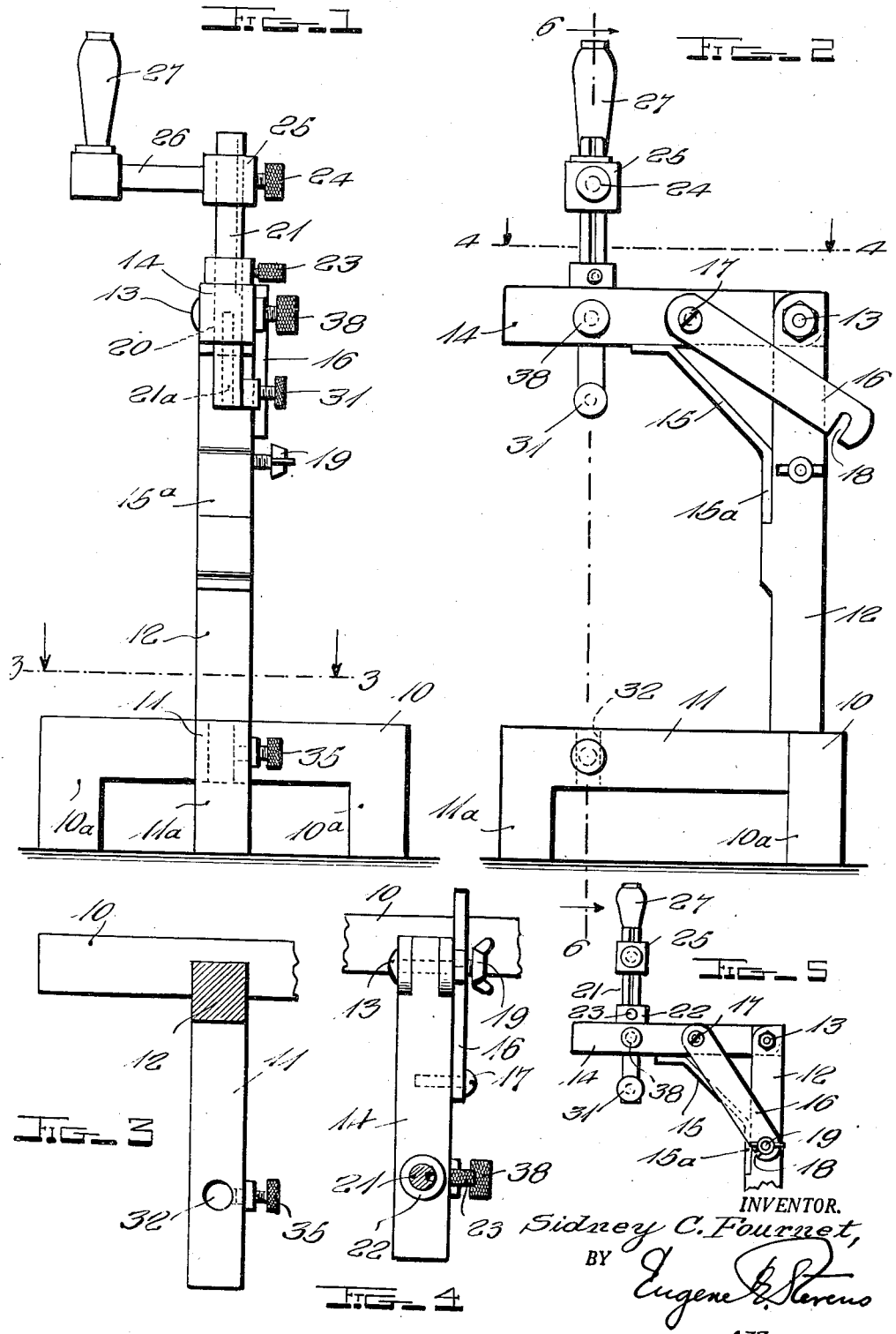

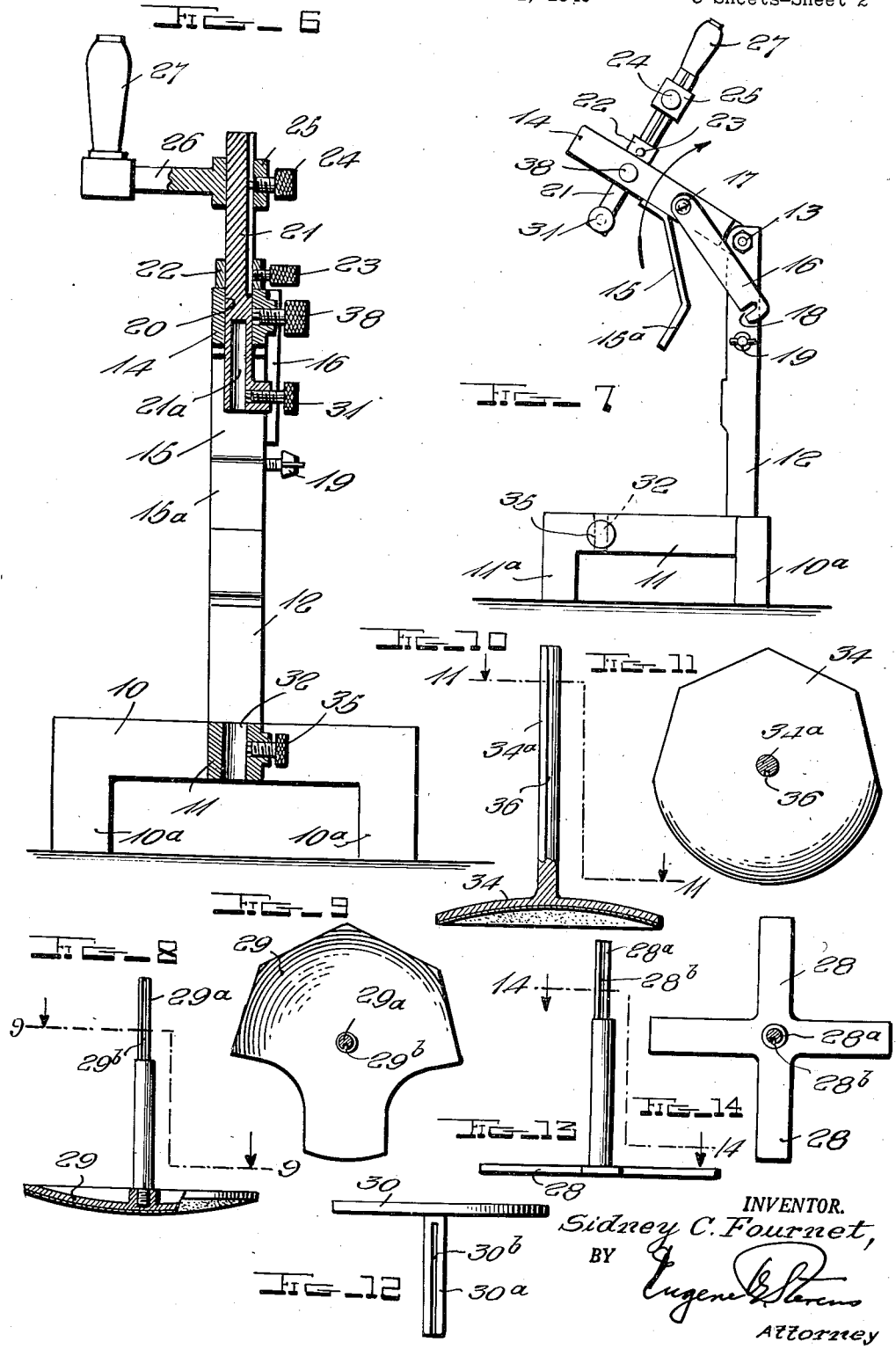

2,270,629

UNITED STATES PATENT OFFICE 2,270,629

METHOD AND APPARATUS FOR MAKING DENTAL RESTORATIONS

Sidney C. Fournet, New Orleans, La.

Application June 11, 1940, Serial No. 339,983

4 Claims. (Cl. 32—32)

My invention relates to improvements in dental apparatus and in methods of making dental restorations.

Briefly and generally stated, my invention has for one of its primary objects to provide a novel method and apparatus for making restorations whether plate or otherwise—and especially for effecting the accurate setting of certain artificial teeth in respect to adjacent teeth and for grinding to a predetermined radius the occlusional surface or surfaces of one or a plurality of artificial teeth.

Additionally, the invention contemplates the provision of a novel dental articulator which comprehends opposed model mounts which are relatively adjustable toward and away from one another, one of such mounts being journalled in a fixed bearing whereby it can be rotated; and said mount also having attachment means for a spherically surfaced grinding element of predetermined radius.

The invention also resides in certain novel features of construction, combination and arrangement of apparatus parts, and in modes and methods of operation thereof; and also in methods of restoration making generally, all of which will be fully understood and appreciated by those skilled in the art from a reading of the following detailed description of the hereindisclosed now preferred example of the invention in connection with the accompanying drawings which illustrate the same.

Needless to say, the invention, as generically disclosed herein, is susceptible of many changes and modifications within the spirit and scope of the claims which appear hereinafter.

In the drawings, wherein the same reference characters have been used to designate the same parts throughout the several views:

Figure 1 is a front elevational view of a device for use in making dental restorations;

Figure 2 is a side elevational view of the same with a latch element released;

Figure 3 is a section on line 3—3 of Figure 1;

Figure 4 is a section on line 4—4 of Figure 2;

Figure 5 is a fragmentary view similar to Figure 2 but showing the latch element 16 in operative position;

Figure 6 is a vertical section on line 6—6 of Figure 2;

Figure 7 is a view similar to Figure 2, but showing certain parts in a different position;

Figure 8 shows an elevation of a grinding element, partly in section;

Figure 9 is a section on line 9—9 of Figure 8;

Figure 10 is a view similar to Figure 8 of a different grinding element;

Figure 11 is a section on line 11—11 of Figure 10;

Figure 12 is a side elevation of a model mounting plate;

Figure 13 is a side elevation of a spider element;

Figure 14 is a section on line 14—14 of Figure 13;

Figure 15 is a sectional side elevational view, partly in section illustrating the use of the spider element of Figs. 13 and 14 in carrying out the first step of my process;

Figure 16 illustrates the anchoring of the upper bite rim to the lower bite rim as the second step of my process;

Figure 17 is another sectional side elevational view showing the third step of the process, namely, the mounting of the upper model on the upper bite rim;

Figure 18 is a sectional side elevation showing the use of the grinding element of Figure 8 in setting the teeth of the lower jaw restoration as the fourth step of the process, the fifth step (the setting of the upper jaw teeth) being similar;

Figure 19 is a sectional side elevation showing the matching engagement of the assembled upper and lower restorations for checking purposes, same being an optional sixth step in the process.

Figure 20 is a vertical section showing the grinding of the teeth of the lower jaw restoration as a further step of the process; and Figure 21 is a view similar to Figure 20 but illustrating the grinding of the teeth of the upper jaw restoration as a still further step of said process.

Referring to the drawings by reference characters, Figures 1, 2 and 3 show that the contrivance comprises a T-shaped base having the head member 10 and the stem member 11 which provide the downturned supporting feet 10a, 11a, respectively.

Rising from the base at the junction of the head and stem members 10 and 11 is the post 12 to the upper end of which is pivoted as at 13, the arm 14. A rearwardly and downwardly extending support 15 carried by the arm 14 has the angularly disposed flattened lower end portion 15a which normally engages post 12 to dispose arm 14 in horizontal position as shown in Figure 2.

When using the device for grinding teeth, as will be hereinafter explained, it is desirable for purposes of stability to clamp the support 15a firmly against post 12 so as to maintain the arm in horizontal position. For this purpose I provide the brace member 16 which is pivoted as at 17 to one side of the arm 14 between the ends of the latter and has adjacent its other end the edge slot 18 which is adapted to receive the shank of the thumb screw 19 carried at one side of the post 12 as best shown in Figure 2.

Adjacent its outer end the arm 14 has the vertical bearing hole 20 which slidably and rotatably receives the shaft 21 having the adjustable set collar 22 secured thereto by means of the set screw 23. Collar 22 rests upon the upper surface of arm 14 to variably limit projection of shaft 21 through the bearing hole 20 and toward the subjacent base member 11.

Adjacent its upper end the shaft 21 has secured thereon by set screw 24 the bearing end 25 of a crank arm 26 having a crank handle 27 as shown.

The lower end of the shaft 21 has the socket 21a which is adapted to selectively receive the stem reductions 28a, 29a, 30a of spider member 28, grinding member 29 and upper jaw model mounting member 30, respectively. The uses of these elements will be presently explained. A set screw 31 carried by the shaft 21 at the site of socket 21a serves to detachably hold the respective stem reductions 28a, 29a, 30a in place. If desired the said stem reductions may have seats 28b, 29b, 30b, respectively to receive the end of set screw 31.

As shown the forward portion of the base member 11 has the vertical bearing hole 32 which is concentric with the bearing hole 20 of arm 14, and is adapted to selectively and adjustably receiving the stems 33a, 34a of a lower jaw model supporting plate 33 and an upper jaw restoration grinding element 34. A set screw 35 carried by base member 11 is adapted to engage in a lineal groove 36 in stem 34a and in a like groove (not shown) in the stem 33a of the support 33, to hold them against turning; and also in a predetermined vertical adjustment.

The operation of my device in carrying out my novel method of making a full denture restoration comprising upper and lower plates is as follows:

First, the upper and lower plaster jaw models 39 and 40, respectively, and the upper and lower bite rims 41, 42, respectively, are produced in the usual well-known manner.

Next, stem 33a of said lower model-carrying plate 33 is inserted in the hole 32 of the base portion 11, whereupon the set screw 35 is tightened up into the groove of stem 33a to hold said stem in place. Following this, the lower bite rim 42 is disposed in place upon the lower jaw model 40 and the latter is deposited upon the lower model-carrying plate 33.

Following this, the stem 28a of the spider member 28 is seated in the socket 21a of the upper shaft member 21, and the screw 31 is tightened up. The screw 23 of set collar 22 is now loosened and the shaft 21 is lowered to dispose the web member 28 on the lower bite rim 42 as shown in Fig. 15. Thumb screw 38 of arm 14 is now tightened against shaft 21 so that spider member 28 will retain bite rim 42 in place on the lower jaw model 40 while the latter is being waxed or otherwise secured to mounting plate 33.

After the lower jaw model has been secured to the lower model-supporting plate 33 the spider 28 is removed from the lower bite rim 42 and the upper bite rim 41 is properly positioned on the lower bite rim 42 and secured in place by staples 43 as shown in Fig. 16.

Turning to Fig. 17 it will be noted that while the upper and lower bite rims 41 and 42 are held in proper relation by the staples 43, the upper jaw model 39 is fitted into the upper bite rim 41 and is waxed or otherwise secured to the upper model-supporting plate 30.

The foregoing operations having been completed the staples 43 are removed and the upper model carrying plate 30 with the upper jaw model 39 and its attached upper bite rim 41 are removed from the socket 21a of shaft 21.

The next operation is the setting of the artificial teeth 44 in the lower bite rim 42. In carrying out this phase of the invention the stem 29a of a convex surfaced grinding element 29 is secured in the socket 21a of shaft 21. Then the shaft 21 is secured in a predetermined adjusted position which will dispose the convex surface of grinding element 29 just the distance above the lower bite rim that artificial teeth 44 should project therefrom.

Now the arm 14 is swung back out of the way and the artificial teeth 44 are set in the lower bite rim 42 one at a time. After each tooth 44 is set the arm 14 is swung forwardly to its horizontal position to bring the convex surface of grinding element 29 into delicate contact with the outer end of said tooth and, of course, with the outer ends of any previously set teeth to make sure that same project the proper distance from the lower bite rim 42.

When the setting of the lower jaw teeth 44 has been completed as aforesaid, the lower carrier plate 33 with the lower jaw model 40 attached is removed from the device. The stem 30a of the upper model plate 30 is now secured in the hole 32 of base portion 11 and the artificial teeth 44a are set in the upper bite rim 41 and accuracy of setting tested as previously described in connection with the lower bite rim 42.

The setting of the teeth 44, 44a having been completed the two models with the teeth-carrying bite rims attached can be installed on the device as indicated in Fig. 19 and appropriate adjustment of shaft 21 or stem 33a made to bring teeth 44, 44a into engagement to make sure that there is uniform contact of same through.

A further check of the accuracy of the setting of the teeth 44, 44a in their respective bite rims 42, 41 may be resorted to before the latter are subjected to the usual vulcanizing or hardening process. This further check consists in subjecting teeth 44, 44a to the very light abrading action of the convex and concaved surfaced grinding elements 29, 34, respectively, as indicated in Figs. 20 and 21, and in a manner to be presently described. If any tooth 44 or 44a is improperly set in its bite rim 42 (or 41) that fact will be indicated by the fact that it has been abraded more or less than its fellows by the action of the grinding elements 29 (or 34), or has escaped being abraded at all. Correction can then be made.

After the teeth 44, 44a have been properly and accurately set in their respective bite rims 42, 41, the latter are vulcanized or hardened to hold the teeth permanently in place. Then the occlusional surfaces of the teeth are ground in using the grinding element 29 for the lower teeth 44 and the grinding element 34 for the upper teeth 44.

The final grinding in of the occlusional surfaces of the teeth after vulcanization of the bite rims 42, 41, is performed in the same fashion as was the light accuracy of setting-test-grinding, heretofore referred to, and will now be described.

First, however, it should be understood that the convex grinding surface of the member 29 and the concave abradant surface of the member 34 correspond to segments of the same sphere having a predetermined radius. It is well-known that the teeth of an upper and lower restoration must be ground in on the same radius in order to function properly. The dentist decides in advance what radius should be used and selects sphere segment grinding elements 29, 34, corresponding thereto.

To grind in the occlusional surfaces of the teeth 44 of the lower restoration the stem 33a of the plate 33 with the assembled lower model 40 and hardened bite rim is secured in the hole 32 of base portion 11. The stem 29a of the convex surfaced grinding member 29 is now tightly secured in the socket 21a of shaft 21, whereupon shaft 21 is lowered to bring the convex grinding surface of member 29 into firm engagement with the teeth 44.

Collar 22 is now tightly secured to shaft 21 spaced above the upper surface of arm 14, a distance equal to the amount the teeth 44 are to be ground. The grinding of the teeth 44 is effected by rotation of shaft 21 by crank 27 and ceases after collar 22 has engaged the upper surface of arm 14.

The shaft 21 will preferably have transverse graduations 45 so that said initial setting of collar 22 with respect to the upper surface of arm 14 can be accurately made and will be the same for the grinding in of both sets of teeth 44, 44a.

Figure 21 illustrates the grinding in of the teeth 44a of the upper set using the concave surfaced grinding element 34 whose stem 34a is rigidly secured in the base hole 32. Here the upper model with the processed teeth-carrying bite rim 41 in place is rotated with the teeth 44a in contact with the concave surface of said grinding element 34, the stem 30a of the upper model carrying-plate 30 being tightly secured in the socket 21a of the rotatable crank operated shaft 21. It will be understood, however, that the parts can be reversed if desired which means that the model 39 can be secured to base member 11 and the grinding element 34 to the rotatable shaft 21.

From the foregoing description taken in connection with the accompanying drawings, the advantages of my novel process and apparatus will be understood and appreciated by those skilled in the art. Accurate setting of the teeth is assured and the grinding in of the occlusional surfaces of the teeth to conform to an arc of predetermined radius is accomplished much quicker and efficiently than by previously known methods.

It will be understood, of course, that the grinding elements 29 and 34 (Figs. 8 and 10) may be actual grinding stones or may simply have their working faces covered with abradant material as shown.

Also since the working faces of grinding elements 29 and 34 are segments of the same sphere and the grinding is effected by vertical axis rotation, absolutely accurate grinding of the occlusional surfaces of the teeth is assured regardless of the relative vertical adjustment of the stems of the model-mounting plate and grinding element. This also admits of lengthening or shortening of the vertical dimension after the models are mounted on plates 30, 33 without affecting the surfaces of occlusion which have been formally established, and without having to make changes in the mouth.

Having thus described my invention what I claim as new is:

1. A device for the purpose specified comprising a base, a standard rising from said base, an arm transversely pivoted to said standard, means including said standard for normally supporting said arm in parallelism with said base, a vertically journalled shaft vertically slidably carried in said arm above said base, said base and the lower end of said shaft having aligned retaining seats, model mounts and grinding means selectively and fixedly engageable in said seats, adjustable means movable axially on said shaft and engageable with said arm to limit sliding movement of the shaft toward said base and means for rotating said shaft in said arm.

2. The method of grinding the occlusal surfaces of a dental restoration which comprises bringing the teeth of the restoration into engagement with a spherical grinding surface whereof the radii converge at a point intercepted by the longitudinal axes of the teeth, and setting up relative rotation between the restoration and grinding surface on a fixed axis centrally disposed with respect to the restoration.

3. The method of grinding the occlusal surfaces of a dental restoration which comprises bringing the teeth of the restoration into engagement with a spherical grinding surface arranged to engage all teeth, and effecting relative rotation between the grinding surface and restoration on a fixed axis centrally disposed with respect to the restoration and intercepted at a common point by the convergent longitudinal axes of the restoration teeth.

4. The method of grinding the occlusal surfaces of a dental restoration which comprises bringing into contact the teeth of the restoration and a spherical grinding surface arranged to engage all teeth, effecting relative rotation between the grinding surface and the restoration on a fixed axis centrally disposed with respect to the restoration and intercepted at a point spaced therefrom by the convergent longitudinal axes of the teeth, forcibly advancing said restoration and grinding surface into closer relation axially along said fixed axis of rotation during said relative rotation, and continuing said relative rotation and advancement for a predetermined axial distance along said fixed axis of rotation.

SIDNEY C. FOURNET.